US012705370B2

(12) United States Patent
Weston et al.

(10) Patent No.: US 12,705,370 B2
(45) Date of Patent: Aug. 11, 2026

(54) TEXT MESSAGE DE-ESCALATION SYSTEM

(71) Applicant: FORD GLOBAL TECHNOLOGIES, LLC, Dearborn, MI (US)

(72) Inventors: Keith Weston, Canton, MI (US); John Robert Van Wiemeersch, Novi, MI (US); Brendan F. Diamond, Naples, FL (US)

(73) Assignee: Ford Global Technologies, LLC, Dearborn, MI (US)

( * ) Notice: Subject to any disclaimer, the term of this patent is extended or adjusted under 35 U.S.C. 154(b) by 71 days.

(21) Appl. No.: 18/894,732

(22) Filed: Sep. 24, 2024

(65) Prior Publication Data

US 2026/0087148 A1 Mar. 26, 2026

(51) Int. Cl.
*G06F 21/60* (2013.01)

(52) U.S. Cl.
CPC .................................. *G06F 21/602* (2013.01)

(58) Field of Classification Search
CPC ..................................................... G06F 21/602
See application file for complete search history.

(56) References Cited

U.S. PATENT DOCUMENTS 9,654,437 B2 5/2017 Shen et al.
10,893,010 B1 1/2021 Argenti et al.
11,847,416 B2 12/2023 Kadam et al.
2020/0099665 A1* 3/2020 Herzberg ................ G06F 21/53
2021/0274010 A1* 9/2021 Stein ................... H04L 67/5651

OTHER PUBLICATIONS

HyperWrite AI Tools, Friendly Tone Converter—Making Your Messages Friendlier, retrieved from https://www.hyperwriteai.com/aitools/friendly-tone-converter on Jun. 20, 2024.
SoftBank Corp. Developing AI-Powered Emotion Canceling Solution to Protect Workers From Customer Harassment, retrieved from https://www.softbank.jp/en/sbnews/entry/20240607_01 on Jun. 20, 2024.
NPM, Inc., @coffeeandfun/remove-pii, Remove-PII (personally identifiable information) From Text created by Coffee & Fun LLC, retrieved from https://www.npmjs.com/package/@coffeeandfun/remove-pii on Jun. 20, 2024.

* cited by examiner

*Primary Examiner* — Baotran N To
(74) *Attorney, Agent, or Firm* — Joseph Zane; Brooks Kushman P.C.

(57) ABSTRACT

Managing text message communications in vehicles using artificial intelligence is provided. Communication metrics are sent from a server to a plurality of vehicles, defining indications of text message events that may affect driver and communication effectiveness. The server receives, from the vehicles, aggregated text message data and high-fidelity text message data collected by the vehicles in response to the occurrence of text message events. The high-fidelity text message data is analyzed using an AI-based text analysis service to determine updated communication metrics. This analysis employs machine learning techniques with delayed feedback based on user interactions and real-world outcomes. The updated communication metrics are provided to the plurality of vehicles to aid in the detection and modification of text messages, enhancing communication quality. The system includes user-configurable preferences, encryption for privacy, and adaptive learning to increase effectiveness over time.

20 Claims, 5 Drawing Sheets

TEXT MESSAGE DE-ESCALATION SYSTEM

TECHNICAL FIELD

Aspects of the disclosure generally relate to automatic analysis and modification of text messages in vehicles using artificial intelligence (AI).

BACKGROUND

Connected vehicles are increasingly equipped with advanced communication systems that allow drivers to send and receive text messages through voice commands or vehicle human-machine interfaces. As these systems become more prevalent, the volume and frequency of text message communications in vehicles continue to grow.

However, poorly worded messages sent from vehicles may lead to miscommunication or escalated conflicts. Traditional text messaging systems in vehicles lack the capability to intelligently analyze and modify message content to increase communication quality.

Some vehicles are equipped with basic text message management systems that can read messages aloud or allow voice-to-text input. However, these systems typically lack the sophistication to understand the context, emotion, or potential influence of the message content. They also do not have the ability to suggest modifications to de-escalate conflicts, increase clarity, or enhance the overall quality of communication.

SUMMARY

In one or more illustrative aspects, a method for managing text message communications in a vehicle includes receiving, at a vehicle communication system, a text message for processing; encrypting the text message using a secure encryption method, sending the encrypted text message to an AI engine for analysis, receiving, from the cloud-based AI engine, a modified encrypted text message, decrypting the modified encrypted text message, and presenting the decrypted modified text message to a user through a vehicle human-machine interface. The AI engine is configured to analyze and modify the text message to de-escalate emotional content and increase communication effectiveness based on user-defined preferences.

In one or more illustrative aspects, the user-defined preferences include one or more of: specific contacts or categories of contacts for message modification, vehicle conditions triggering message modification, time-based triggers for message modification, event-based triggers for message modification, contact-specific phrasing modifications, disallowed words or trigger words for removal or modification, removal or modification of names that might trigger emotion, removal of personally identifiable information, and face blurring for photos in text messages.

In one or more illustrative aspects, the method further includes detecting a set of vehicle conditions, and determining whether to modify the text message based on the detected vehicle conditions and user-defined preferences.

In one or more illustrative aspects, the vehicle conditions include one or more of vehicle speed, following distance to another vehicle, number of occupants in the vehicle, time of day, vehicle location, and detection of specific objects within the vehicle.

In one or more illustrative aspects, the method is applied to both outgoing and incoming text messages.

In one or more illustrative aspects, the method further includes presenting the modified text message to the user for approval before sending, and replacing the original text message with the modified text message upon user approval.

In one or more illustrative aspects, the secure encryption method is advanced encryption standard encryption.

In one or more illustrative aspects, a system for managing text message communications in a vehicle includes a vehicle communication system including one or more hardware processors and a storage configured to maintain user preferences. The vehicle communication system is configured to: receive a text message for processing, encrypt the text message using a secure encryption method, send the encrypted text message to a cloud-based AI engine for analysis, receive a modified encrypted text message from the cloud-based AI engine, decrypt the modified encrypted text message, and present the decrypted modified text message to a user through a vehicle human-machine interface. The cloud-based AI engine is configured to analyze and modify the text message to de-escalate emotional content and increase communication effectiveness based on user-defined preferences stored in the vehicle communication system.

In one or more illustrative aspects, the user-defined preferences include criteria for selecting which text messages to modify based on one or more of sender or recipient identity, vehicle conditions, time of day, vehicle location, and detected events or milestones.

In one or more illustrative aspects, the vehicle communication system is further configured to detect a set of vehicle conditions, and determine whether to send the text message for modification based on the detected vehicle conditions and user-defined preferences.

In one or more illustrative aspects, the vehicle communication system is further configured to apply modifications to both outgoing and incoming text messages.

In one or more illustrative aspects, the vehicle communication system is further configured to present the modified text message to the user for approval before sending, and replace the original text message with the modified text message upon user approval.

In one or more illustrative aspects, the AI engine is hosted by a trusted third-party provider or the application licensee or assignee.

In one or more illustrative aspects, the vehicle communication system is further configured to remove personally identifiable information from text messages before encryption and sending to the cloud-based AI engine.

In one or more illustrative aspects, a method for enhancing text message communication in a vehicle includes receiving, at a vehicle communication system, user preferences for text message modification, detecting a trigger event based on the user preferences, responsive to detecting the trigger event, intercepting a text message, encrypting the intercepted text message, sending the encrypted text message to a cloud-based AI engine for analysis and modification, receiving a modified encrypted text message from the cloud-based AI engine, decrypting the modified encrypted text message, and presenting the decrypted modified text message to a user through a vehicle human-machine interface.

In one or more illustrative aspects, the trigger event includes one or more of detection of specific vehicle conditions, receipt of a message from a specific contact or category of contacts, detection of specific words or phrases in the text message, detection of emotional content in the text message, time-based triggers, and location-based triggers.

In one or more illustrative aspects, the method further includes delaying notification of an incoming text message based on user preferences and detected vehicle conditions.

In one or more illustrative aspects, the method further includes applying face blurring to photos in text messages based on user preferences.

In one or more illustrative aspects, the cloud-based AI engine is configured to modify the text message to de-escalate emotional content, increase clarity of communication, remove or modify potentially offensive language, enhance politeness, and increase sophistication of language used.

In one or more illustrative aspects, the method further includes maintaining a secure database of approved contacts and their associated preferences for text message modification, and applying contact-specific modifications to text messages based on the secure database.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

Figure 1:
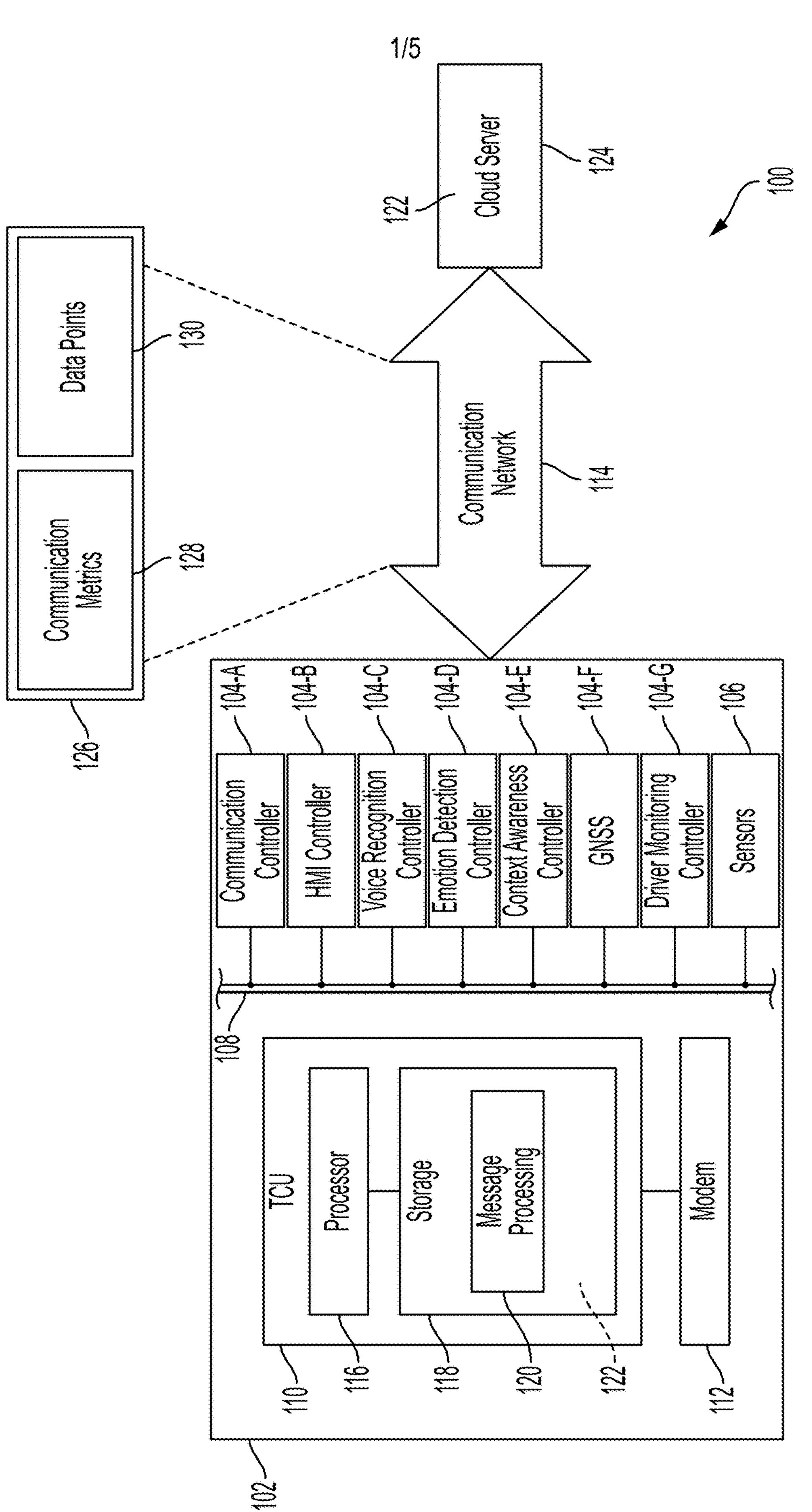
FIG. 1 illustrates an example system for capturing high-fidelity data points to analyze and modify text messages using an AI-based approach with adaptive feedback.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

An AI-based text message de-escalation system for vehicles offers the potential to increase communication and effectiveness by analyzing and modifying text messages in real-time. This system is based on signals captured by the vehicle's communication systems and sensors, which are reflective of the driver's emotional state, driving conditions, and communication patterns. The signals used by the AI system are primarily based on text message content, voice inflection, and other contextual data readily available in the vehicle. A sophisticated communication quality metric may be defined based on the occurrence of various text message events, emotional indicators, and driving conditions.

Using existing vehicle communication systems to manage text messages effectively is challenging for several reasons. First, the large amount of text and contextual data is difficult to transmit and analyze in real-time. Second, aggregation of communication data into meaningful metrics can provide noisy or inconsistent results. Third, existing text management systems in vehicles are often designed for simple voice-to-text conversion and may be poor indicators of communication quality. Fourth, generating new text analysis metrics using human knowledge alone is difficult to scale and may not capture the nuances of in-vehicle communication effectively.

Many vehicle manufacturers lack high-fidelity data on driver communication patterns and emotional states, which is essential for developing accurate metrics associated with communication and effectiveness. Although the collection of high-fidelity data from test fleets can lead to the development of increased communication metrics, this data may be biased. For example, test fleet drivers may exhibit different communication patterns compared to typical vehicle owners in various real-world scenarios.

Using communication metrics based solely on basic text analysis or voice recognition may result in noisy or biased data, leading to poorer performance compared to using more sophisticated AI-based analysis. Additionally, users may be concerned about privacy when it comes to continuous monitoring of their communications. Therefore, a smarter method of data collection, analysis, and text modification is necessary to balance effectiveness with user privacy and acceptance.

In addition to text data, there are numerous unstructured data sources, such as voice inflection, vehicle sensor data, and contextual information, that are available to the vehicle. Time series data from vehicle sensors can also provide valuable context for text message analysis. Yet, it may be desirable to identify metrics within this unstructured data that statistically correlate with communication and effectiveness. Examples include detecting driver stress levels, identifying potential road rage situations, or recognizing patterns of preoccupied driving related to text message use.

Aspects of the disclosure generally relate to accurately analyzing and modifying text messages based on driver behavior and communication patterns, allowing for more effective in-vehicle communication. This involves efficiently collecting and analyzing real data from users to identify communication metrics from raw data, which can then be applied to an AI model to predict and modify text messages accurately. The disclosed approach may do so by capturing high-fidelity text and contextual data points to assess communication quality using advanced machine learning techniques with adaptive feedback. Further aspects of the disclosure are discussed in detail herein.

FIG. 1 illustrates an example system 100 for modifying text messages using an AI-based system 122 to minimize the elicitation of negative emotions. The system 100 includes one or more vehicles 102, each equipped with vehicle controllers 104 and sensors 106. Each vehicle 102 includes vehicle buses 108 for communication between the vehicle controllers 104, sensors 106, and a telematics control unit (TCU) 110. The TCU 110 incorporates or accesses a modem 112 configured to facilitate communication over a communication network 114. The TCU 110 may also include a processor 116 and storage 118. A message processing application 120 stored in the storage 118 is configured to process text messages using the AI-based system 122, which may be hosted either on vehicle 102 or on a cloud server 124.

The AI-based system 122 operates to suggest less reactive, more polite, more sophisticated, and/or more confidential ways to convey text messages processed through the vehicle's system. The system 100 is user-configurable, allowing users to opt in and control when and how the feature intervenes. Configurations may be based on specific contacts or categories. For example, the system may be configured to intervene only with family members, work colleagues, or members of a particular group. It may also be set to intervene with particular contacts.

The system 100 may be configured to intervene based on vehicle conditions or location. For example, intervention may occur only when the following distance is small (e.g., within a predefined distance threshold), only when the vehicle speed is within a particular range, only when the driver is alone in the vehicle, or based on the time of day, such as between particular hours. The system may also be configured to intervene before or after certain events or milestones. For instance, intervention may occur only after the user has had their morning coffee, which may be verified by passing a location such as a Starbucks drive-thru or through image recognition of a coffee cup in the driver's hand.

For incoming messages, if the AI-based system 122 interprets that a received text would escalate emotion, the notification of that message may be delayed until certain conditions are met, such as when the driver is around other people, when specific other people (e.g., the driver's spouse) are present in the vehicle, or when the vehicle is in park or below a certain speed threshold.

The AI-based system 122 may apply special filters based on the target of the text. Different phrasing may be used for different recipients, such as parents, friends, children, or a boss. Disallowed words or trigger words based on the target of the text may be removed or modified. Names that might trigger emotion may be removed or altered.

The system 100 may include a "review before send" function that allows the user to approve the modified text before it is sent. This function may replace the original text with the new text if the user approves. Optional features may include removing personally identifiable information (PII) content, similar to how voicemail transcription services handle sensitive information. For texted photos, optional face blurring may be applied if the face is not in an approved look-up file.

The vehicle controllers 104 of the vehicle 102 manage various vehicle functions, including communication and text messaging features. The functionality of these controllers 104 may be integrated or distributed across multiple controllers. As depicted, the example vehicle controllers 104 are represented as discrete vehicle controllers 104A through 104G. vehicle controllers 104 includes a communication controller 104A configured to manage text messaging and voice communication systems; a human-machine interface (HMI) controller 104B configured to receive user input and provide feedback, a voice recognition controller 104C configured to process voice commands and analyze voice inflection; an emotion detection controller 104D configured to determine the driver's emotional state, a context awareness controller 104E configured to gather and process contextual information about the vehicle's environment and driving conditions, a global navigation satellite system (GNSS) controller 104F configured to provide vehicle location information, and a driver monitoring controller 104G configured to observe driver behavior.

The sensors 106 provide information relevant to text message analysis and modification. These may include cameras, such as driver-facing cameras for emotion detection or image recognition of objects like a coffee cup in the driver's hand; microphones for voice analysis; biometric sensors for stress level detection; and various vehicle sensors for gathering contextual data such as vehicle speed, location, time of day, weather conditions, and traffic conditions.

Vehicle buses 108 facilitate communication between the vehicle controllers 104, sensors 106, and the TCU 110. Examples may include a controller area network (CAN), Ethernet network, media-oriented system transfer (MOST) network, or wireless communication networks.

The TCU 110 captures communication signals 126 from the vehicle controllers 104 and sensors 106. These communication signals 126 may include communication metrics 128 and data points 130, such as text message content, voice inflection data, emotional state indicators, driver focus levels, vehicle speed, location, time of day, and other contextual information. The communication metrics 128 define specific conditions or events that trigger the AI-based system 122 to intervene, such as detection of emotional language, use of profanity, rapid input, or discrepancies between text content and the detected emotional state.

The data points 130 provide high-fidelity information captured from the sensors 106 and vehicle controllers 104, which the AI-based system 122 uses to analyze and modify text messages. These data points 130 offer detailed contextual information that helps the AI-based system 122 generate appropriate modifications to the text messages, enhancing communication effectiveness while minimizing negative emotional responses.

The message processing application 120 uses the communication signals 126, including communication metrics 128 and data points 130, to determine when to intervene in text messaging, based on user-configured settings and analysis by the AI-based system 122.

When configured to intervene, the AI-based system 122 may modify outgoing messages to make them more appropriate or modify incoming messages to reduce potential anxiety or upset for the user. The system may process encrypted messages through the AI-based system 122 to find and recommend a more polite or better way to express the thoughts the user is attempting to convey.

To address privacy and security concerns, encryption protocols ensure that all communications are secure and private. Standard encryption methods, such as Advanced Encryption Standard (AES) encryption or other suitable encryption, may be used to encrypt messages before processing. This is particularly important if the AI-based system 122 is cloud-based. Trusted providers commercial providers may host the cloud-based AI engine. Encryption keys may be handled securely to avoid sharing them with unauthorized parties. Alternatively, the AI-based system 122 may be hosted on the vehicle 102 in storage 118 to keep all processing local and avoid transmitting sensitive data over the network.

The system 100 may enhance messages by adding relevant information from the user's contacts, location data, or internet searches. For example, it may include contact information, suggest nearby locations, or provide additional context to the message content. When enabled, phonebook and internet-based means may be utilized to enhance messages with contact information, phone numbers, website information, and smart location-based recommendations.

For example, consider an original message: "Call John Grandshaw and stop at the closest Store and buy whatever John asks for and some of those Chocolate Chip Protein cookies we like to eat while we are watching the Bills football game." The AI-based system 122 may modify the message as follows: "Call John Grandshaw [734-844-0061-based on your phone contacts] and stop at the closest Store [Store, 44900 Grand River Ave, Novi, MI-based on your shared location] and buy whatever John asks for and some of those Chocolate Chip Protein cookies [https://www.proteincookies.com/products/chocolate-chip-cookies-located in Bay 22 of Aisle 14 at the Novi Store] we like to eat while we are watching the Bills football game [The Bills are playing the Washington Commanders on Friday at 8 PM]."

In this example, phonebook information was used to retrieve John Grandshaw's number. Location sharing was used to locate the nearest Meijer store. Internet searches were used to find the product details and its location within the store, as well as to determine the schedule of the Bills football game.

The AI-based system 122 may correct grammar, formatting, and organize message content logically. It may formalize communication by using more professional words, spelling out acronyms where possible, and applying autoformatting to ensure messages are communicated appropriately. The system 100 may also employ correction mechanisms to adjust grammar and formatting, such as indenting where needed. The AI-based system 122 may review message content and suggest ways to organize it in a logical or chronological manner, using appropriate formatting tools to ensure clarity.

Figure 2:
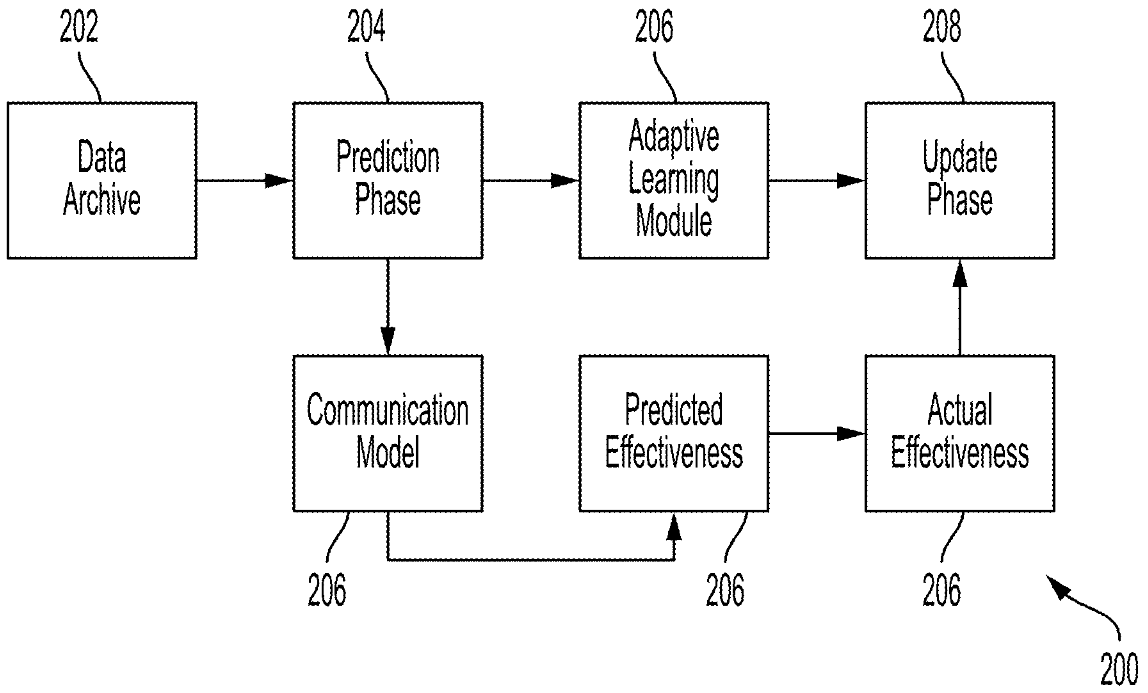
FIG. 2 illustrates an example process for capturing the high-fidelity data points for accurately analyzing and modifying text messages, using an adaptive learning approach with delayed feedback.

FIG. 2 illustrates an example data flow 200 used by an AI-based system to perform adaptive learning approaches for updating communication metrics. The data flow 200 includes a data archive 202 of customer vehicle communication data, a prediction phase 204, an adaptive learning module 206 utilizing various algorithms, and an update phase 208.

The data archive 202 includes a data lake of various communication signals retrieved from multiple vehicles, generally in the form of aggregated data points. The data archive 202 may also include high-fidelity data points and user feedback data, such as user responses to modified messages and subsequent communication patterns from vehicles.

The prediction phase 204 involves applying communication metrics to a communication model to determine a predicted effectiveness 210 of the message modifications. The communication model is configured to calculate the predicted effectiveness 210 based on the data in the customer vehicle data archive 202 over time. Trained on the high-fidelity data points obtained from vehicles and using user feedback data as ground truth for the effectiveness of message modifications, the communication model may take various forms such as natural language processing models, sentiment analysis models, or hybrid approaches. The predicted effectiveness 210 indicates whether a message modification is likely to be well-received and effective, based on communication signals maintained in the data archive 202.

The adaptive learning module 206 determines new candidate communication metrics based on samples of the high-fidelity data points captured from the data archive 202. The high-fidelity data points may include data received from vehicles over time upon satisfaction of communication metrics, indicating that high-fidelity data points should be captured as the vehicles 102 are likely to encounter communication events requiring intervention. Candidate communication metrics may also be used by the adaptive learning module 206 to retrain and improve the communication model using various algorithms.

The update phase 208 includes receiving the predicted effectiveness 210 from the prediction phase 204 and the actual effectiveness 212 from the user feedback data 144, which may be received after the communication signals and high-fidelity data points are collected. The update phase 208 further involves comparing the predicted effectiveness 210 to the actual effectiveness 212. If the candidate communication metrics lead to improved predictions, they are applied to the vehicles as new communication metrics for determining text message events. This process allows the AI-based text analysis service to refine the communication metrics to better capture effective message modifications.

Variations on the data flow 200 are possible. Different adaptive learning algorithms may be employed within the adaptive learning module 206, such as reinforcement learning, supervised learning, deep learning, or other optimization and sampling paradigms.

Figure 3:
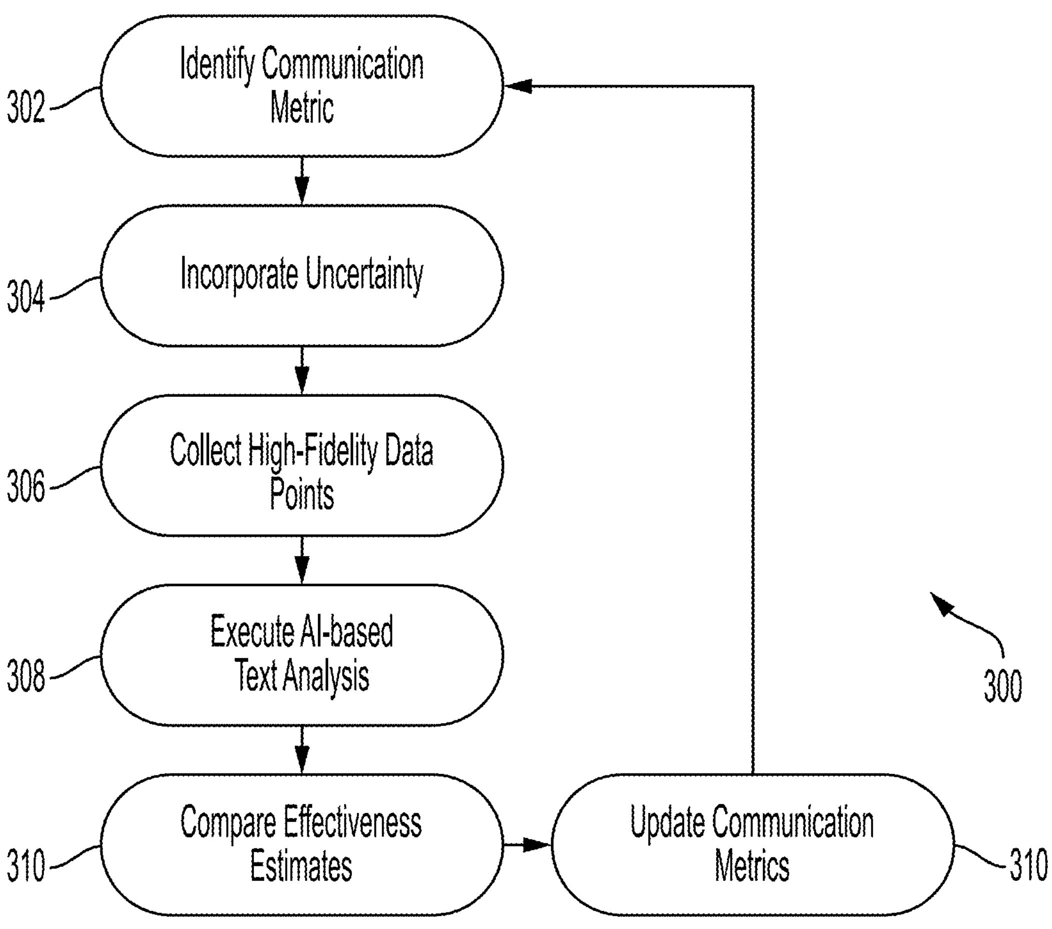
FIG. 3 illustrates an example data flow used by the AI-based text analysis service to perform aspects of the process of FIG. 2.

FIG. 3 illustrates an example process 300 for utilizing the high-fidelity data points to accurately capture effective text message modifications using adaptive learning approaches with delayed feedback. Aspects of the process 300 may be performed by a cloud server in communication with other elements of the system 100.

At operation 302, a communication metric is identified by the AI-based text analysis service based on historical data. This is performed without considering the specific communication patterns of individual drivers, which might provide a biased estimate for message modification effectiveness. High-fidelity data points in the data archive 202 may be used to generate initial communication metrics. The communication metric may include, based on occurrences of events in the high-fidelity data points, an estimated effectiveness of specific message modification strategies.

In this initial step, it should be noted that basic text analysis and voice recognition communication signals are used from the data archive 202, which may result in a biased initial input. Unstructured data sources beyond the communication signals, such as image data from in-vehicle cameras capturing driver facial expressions, may be used to overcome this bias. Computer vision techniques may focus on emotion detection rather than just text analysis. It may be desirable to identify communication metrics within this unstructured data that statistically correlate with effective communication. Examples include detecting signs of driver stress, identifying potential escalation in voice tone, and estimating the urgency of the communication context.

At operation 304, the AI-based text analysis service incorporates uncertainty into the communication metric to account for unknowns and biases in the source data set. This may be achieved by analyzing the variability and reliability of the historical data and applying statistical techniques to quantify the uncertainty. Bias in the source data may stem from factors such as underreporting of minor communication issues, overrepresentation of certain types of text messages, or differences in communication contexts not captured in the historical data. By incorporating these uncertainties and biases, the communication metric may be adjusted to better reflect the true effectiveness of message modifications, considering potential discrepancies in the data.

To capture these communication metrics, a machine learning model may be used to generate a latent space encoding of the text messages and associated contextual data. Example communication models may include advanced natural language processing models trained on diverse communication datasets.

At operation 306, responsive to a vehicle encountering a text message event of interest, a message processing application of the TCU 110 begins collecting high-fidelity data points. These high-fidelity data points are sent from the vehicle to the cloud server or processed on storage of the vehicle depending on the configuration. After a delay, user feedback data is received by the cloud server as well. User feedback data may indicate actual effectiveness, such as the user's response to the modified message and subsequent communication patterns temporally related to the data capture timeframe of high-fidelity data points. It should be noted that the user feedback data may not be received by the cloud server until after a few hours or days. However, this delay may not be present in configurations where the model is hosted on the storage of the vehicle. During that time, the cloud server may collect high-fidelity data points from the vehicle to accurately capture the driver's communication patterns.

At operation 308, the cloud server executes the AI-based text analysis service on the collected high-fidelity data points. This may involve the AI-based text analysis service employing various algorithms, such as reinforcement learning, supervised learning, or deep learning methods, to analyze the data. Due to delayed feedback, the actual effectiveness 212 which serves as the reward signal for learning, may only be known after some time when the user feedback data is received. Based on the analysis, the AI-based text analysis service may utilize probabilities and confidence bounds to calculate an optimal set of communication signals to capture data reflective of the effectiveness of potential message modifications.

Using adaptive learning approaches, regions of predicted effectiveness 210 and uncertainty may be explored over the higher-dimensional space. When the actual effectiveness 212 is determined from the user feedback data, and the initial effectiveness predictors are identified in the communication signals, communication metrics and communication models using candidate communication metrics may be progressively improved over time. Later, specialized algorithms and functions may be built and deployed on the vehicle to reduce the computational load of general communication models. For example, the communication model may be replaced with a trained "emotion detection" image perception model in production, tailored for specific tasks rather than relying on more general models.

At operation 310, the AI-based text analysis service compares the effectiveness estimate determined using the original communication metrics to the effectiveness detected using the updated communication metrics. The cloud server may determine a delta between these effectiveness estimates, making the comparison in view of the actual effectiveness 212 received at operation 306.

At operation 312, if the delta between the original estimated effectiveness and the actual effectiveness 212 is beyond a threshold value, the communication metrics may be updated. If the actual effectiveness 212 is more accurately predicted using the candidate communication metrics instead of the current communication metrics, then the candidate communication metrics determined at operation 306 are accepted as validated communication metrics. These validated communication metrics may be applied back into the system for use in the next cycle of communication metrics discovery and refinement.

Figure 4:
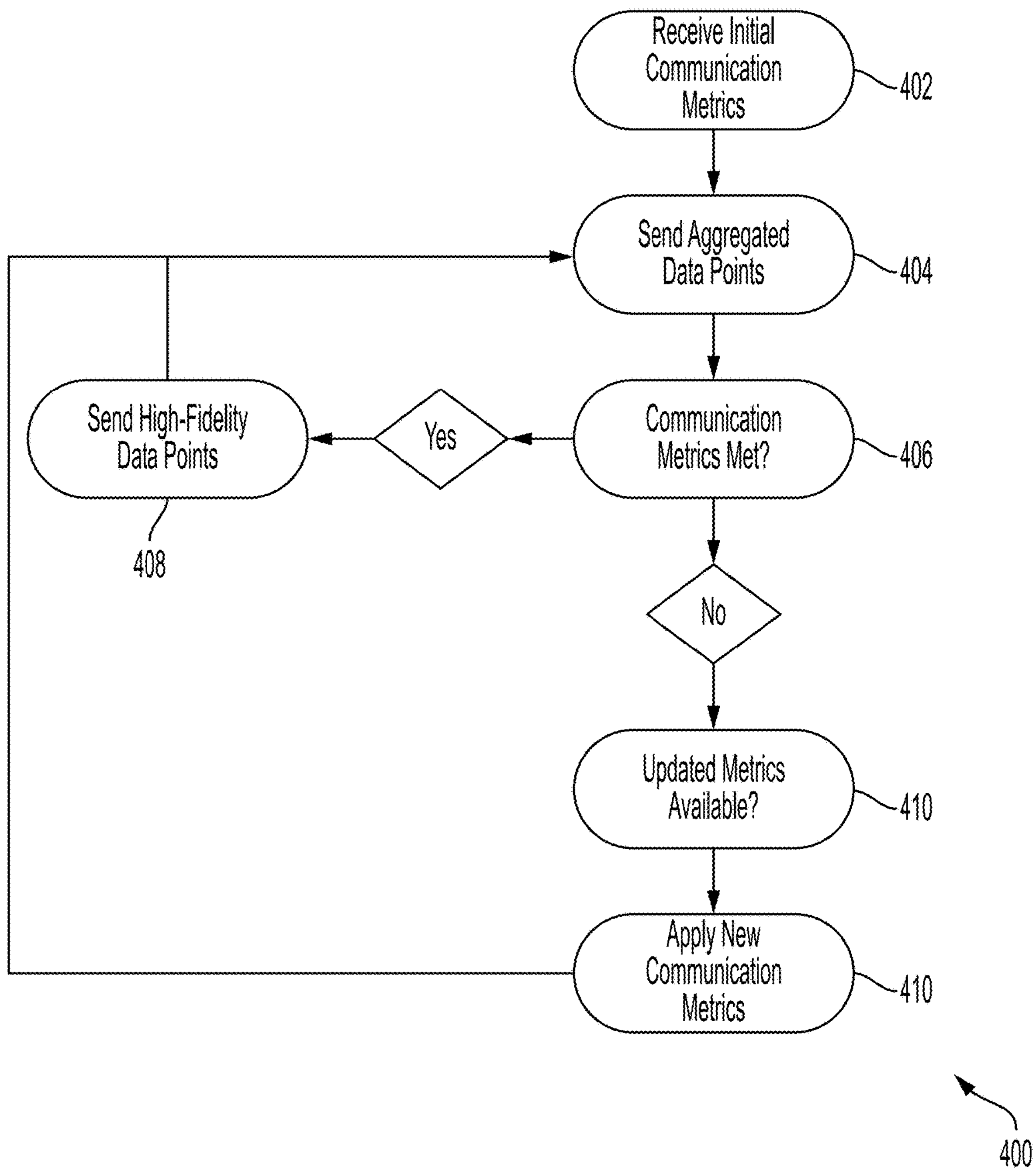
FIG. 4 illustrates an example process for the operation of the vehicle in providing data for the AI-based text message de-escalation system, based on the communication metrics determined according to the process of FIG. 3.

FIG. 4 illustrates an example process 400 for the operation of a vehicle in providing data for the AI-based text message de-escalation system, based on communication metrics determined according to the process 300.

At operation 402, the vehicle receives initial communication metrics. These communication metrics may be received from the AI-based text analysis service of the cloud server based on an initial data set, such as data captured from a diverse set of test vehicles.

At operation 404, the vehicle sends aggregated data points to the cloud server. The TCU may maintain aggregation functions that create aggregated data points based on a weighted collection of the communication signals. These aggregated data points may be transmitted from the vehicle to the cloud server. The aggregated data points may include a subset of the individual communication signals retrieved from the vehicle controllers and sensors over the vehicle buses, weighted according to the aggregation function. In some cases, the aggregated data points may further include contextual information, such as the current time, an identifier of the driver, and location information from the GNSS controller that may be used to augment the captured event information with locations where the vehicle was when the communication events occurred.

At operation 406, the vehicle determines whether any of the communication metrics are met. If the communication metrics require communication signals that have been observed by the vehicle, control passes to operation 408. Otherwise, control continues to operation 410.

At operation 408, the vehicle sends high-fidelity data points to the cloud server. The vehicle sends the captured communication signals and high-fidelity data points according to the communication metrics. These communication signals may include various structured text and voice data received by the TCU from the vehicle controllers via the vehicle buses. The high-fidelity data points may include various unstructured data captured from the sensors, such as driver facial expressions or voice inflections. After operation 408, control returns to operation 404.

At operation 410, the vehicle determines whether updated communication metrics are available. The TCU may receive updated communication metrics from the cloud server based on the updating performed using the process 300. If so, control passes to operation 412.

At operation 412, the vehicle applies the new communication metrics for use in sending high-fidelity data points to the cloud server. The new communication metrics are stored in the storage and used for later analysis of the communication signals to construct high-fidelity data points to send to the cloud server. After operation 412, the process 400 returns to operation 404.

Thus, data from vehicles may be sampled to generate communication metrics without reliance on a biased test fleet. Moreover, the system may use high-fidelity data points to incorporate unstructured data as part of communication metrics not otherwise predicated on basic text analysis features in the communication signals. Furthermore, aggregated data points may be utilized for the determination of effective text message modifications without sending all the communication signals from the vehicle to the cloud server.

Figure 5:
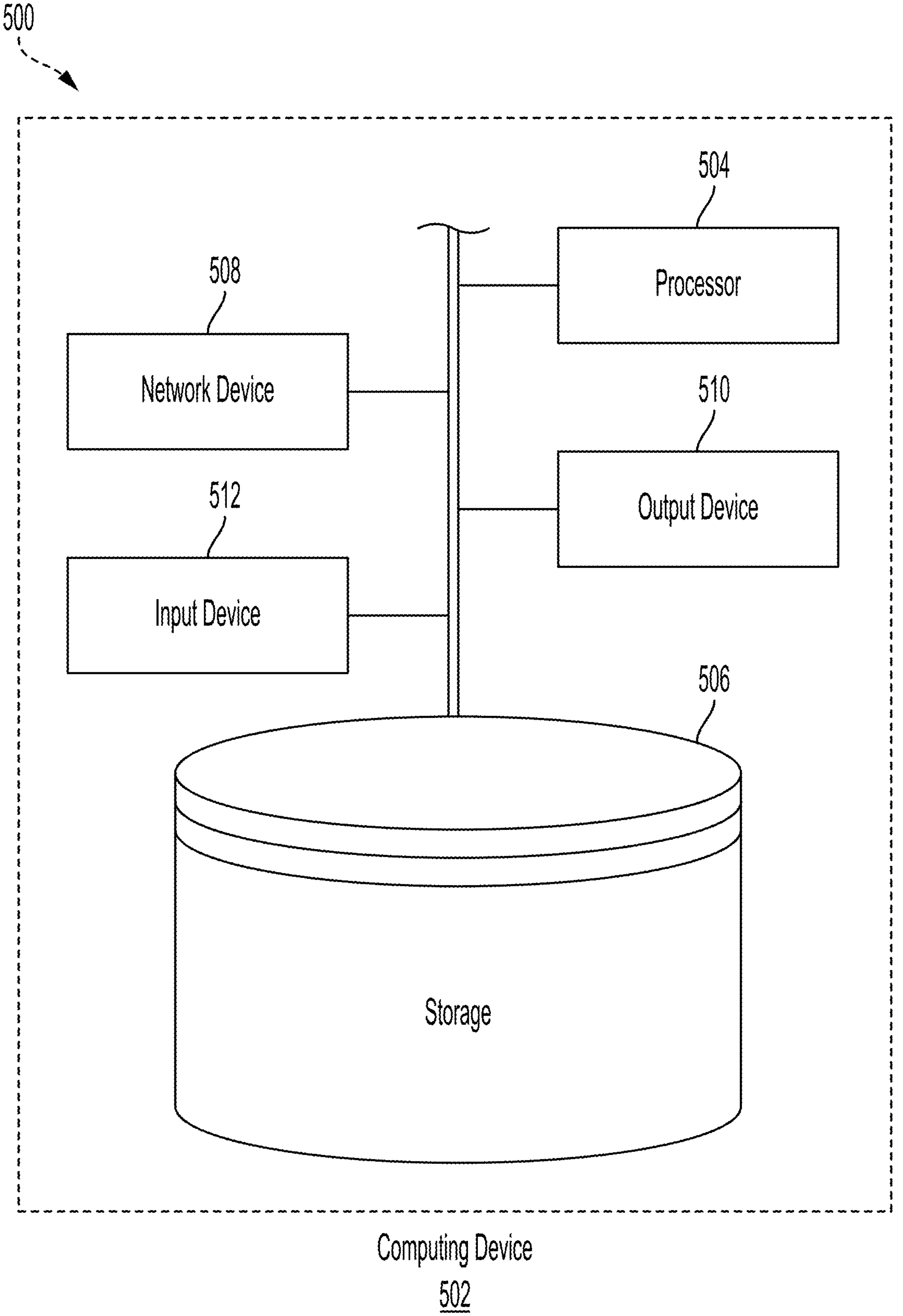
FIG. 5 illustrates an example computing device for capturing high-fidelity data points to analyze and modify text messages using an AI-based approach with adaptive feedback.

FIG. 5 illustrates an example computing device 502 for capturing high-fidelity data points to analyze and modify text messages using an AI-based approach with adaptive feedback. Referring to FIG. 5, and with reference to FIGS. 1-4, the vehicle 102, vehicle controllers 104, sensors 106, TCU 110, and cloud server 124 may be examples of such computing devices 502. Computing devices 502 generally include computer-executable instructions, where the instructions may be executable by one or more computing devices 502. Computer-executable instructions may be compiled or interpreted from computer programs created using a variety of programming languages and/or technologies, including, without limitation, and either alone or in combination, Java™, C, C++, C#, Visual Basic, JavaScript, Python, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data, such as communication signals, high-fidelity data points, communication metrics, communication model, user feedback data, etc., may be stored and transmitted using a variety of computer-readable media.

As shown, the computing device 502 may include a processor 504 that is operatively connected to storage 506, a network device 508, an output device 510, and an input device 512. It should be noted that this is merely an example, and computing devices 502 with more, fewer, or different components may be used.

The processor 504 may include one or more integrated circuits that implement the functionality of a central processing unit (CPU) and/or graphics processing unit (GPU). In some examples, the processors 504 are a system on a chip (SoC) that integrates the functionality of the CPU and GPU. The SoC may optionally include other components such as, for example, the storage 506 and the network device 508 into a single integrated device. In other examples, the CPU and GPU are connected to each other via a peripheral connection device such as Peripheral Component Interconnect (PCI) express or another suitable peripheral data connection. In one example, the CPU is a commercially available central processing device that implements an instruction set such as one of the x86, ARM, Power, or Microprocessor without Interlocked Pipeline Stages (MIPS) instruction set families.

Regardless of the specifics, during operation the processor 504 executes stored program instructions that are retrieved from the storage 506. The stored program instructions, accordingly, include software that controls the operation of the processors 504 to perform the operations described herein, such as text analysis, emotion detection, and message modification. The storage 506 may include both non-volatile memory and volatile memory devices. The non-volatile memory includes solid-state memories, such as Not AND (NAND) flash memory, magnetic and optical storage media, or any other suitable data storage device that retains data when the system is deactivated or loses electrical power. The volatile memory includes static and dynamic random access memory (RAM) that stores program instructions and data during operation of the system 100.

The GPU may include hardware and software for display of at least two-dimensional (2D) and optionally three-dimensional (3D) graphics to the output device 510. The output device 510 may include a graphical or visual display device, such as an electronic display screen, projector, printer, or any other suitable device that reproduces a graphical display. As another example, the output device 510 may include an audio device, such as a loudspeaker or headphone, which may be used for text-to-speech conversion of modified messages. As yet a further example, the output device 510 may include a tactile device, such as a mechanically raiseable device that may, in an example, be configured to display braille or another physical output that may be touched to provide information to a user.

The input device 512 may include any of various devices that enable the computing device 502 to receive control input from users. Examples of suitable input devices 512 that receive human interface inputs may include keyboards, mice, trackballs, touchscreens, microphones for voice input, cameras for facial expression analysis, biometric sensors for stress level detection, and the like.

The network devices 508 may each include any of various devices that enable the described components to send and/or receive data from external devices over networks. Examples of suitable network devices 508 include an Ethernet interface, a Wi-Fi transceiver, a cellular transceiver, or a BLUETOOTH or BLUETOOTH Low Energy (BLE) transceiver, or other network adapter or peripheral interconnection device that receives data from another computer or external data storage device, which can be useful for receiving and transmitting text messages, communication signals, and high-fidelity data points in an efficient manner.

In the context of the AI-based text message de-escalation system, the computing device 502 may serve multiple roles depending on its position within the system. When implemented in a vehicle 102, it may be responsible for capturing communication signals, processing text messages, detecting potential communication issues, and applying initial modifications based on stored communication metrics. It may also handle the collection and transmission of high-fidelity data points to the cloud server.

When implemented as part of the cloud server 124, the computing device 502 may run the AI-based text analysis service, executing complex natural language processing models, emotion detection algorithms, and the adaptive learning processes described earlier. It would be responsible for analyzing the high-fidelity data points, updating the communication model, and generating new communication metrics to be sent back to the vehicles.

The computing device 502, regardless of its role, is designed to handle the real-time processing requirements of the text message de-escalation system. This includes rapid analysis of incoming messages, swift application of modification strategies, and efficient handling of the adaptive learning algorithms that continuously increase the system's performance. With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

In this application, the term "module" and/or "computing device" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method for managing text message communications in a vehicle, comprising:
- receiving, at a vehicle communication system, a text message for processing;
- encrypting the text message using a secure encryption method;
- sending the encrypted text message to an artificial intelligence (AI) engine for analysis;
- receiving, from the AI engine, a modified encrypted text message;
- decrypting the modified encrypted text message; and
- presenting the decrypted modified text message to a user through a vehicle human-machine interface wherein the AI engine is configured to analyze and modify the text message to de-escalate emotional content and increase communication effectiveness based on user-defined preferences.

2. The method of claim 1 wherein the user-defined preferences include one or more of:
- specific contacts or categories of contacts for message modification;
- vehicle conditions triggering message modification;
- time-based triggers for message modification;
- event-based triggers for message modification;
- contact-specific phrasing modifications;
- disallowed words or trigger words for removal or modification;
- removal or modification of names that trigger emotion;
- removal of personally identifiable information; and/or
- face blurring for photos in text messages.

3. The method of claim 1, further comprising:
- detecting a set of vehicle conditions; and
- modifying the text message based on the set of detected vehicle conditions and user-defined preferences.

4. The method of claim 3 wherein the vehicle conditions include one or more of vehicle speed following distance to another vehicle, number of occupants in the vehicle, time of day, vehicle location, and detection of specific objects within the vehicle.

5. The method of claim 1 wherein the method is applied to both outgoing and incoming text messages.

6. The method of claim 1, further comprising presenting a modified text message to the user for approval before sending and replacing the text message with the modified text message upon user approval.

7. The method of claim 1 wherein the secure encryption method is an advanced encryption standard encryption.

8. A system for managing text message communications in a vehicle, comprising: a vehicle communication system including one or more hardware processors and a storage configured to maintain user preferences, the vehicle communication system configured to:
- receive a text message for processing; encrypt the text message using a secure encryption method;
- send the encrypted text message to an artificial intelligence (AI) engine for analysis;
- receive a modified encrypted text message from the AI engine;
- decrypt the modified encrypted text message; and
- present the decrypted modified text message to a user through a vehicle human-machine interface;
- wherein the AI engine is configured to analyze and modify the text message to de-escalate emotional content and increase communication effectiveness based on user-defined preferences stored in the vehicle communication system.

9. The system of claim 8 wherein the user-defined preferences include criteria for selecting which text messages to modify based on one or more of sender or recipient identity, vehicle conditions, time of day, vehicle location, and detected events or milestones.

10. The system of claim 8 wherein the vehicle communication system is further configured to detect a set of vehicle conditions, and determine whether to send the text message for modification based on the detected vehicle conditions and user-defined preferences.

11. The system of claim 8 wherein the vehicle communication system is further configured to apply modifications to both outgoing and incoming text messages.

12. The system of claim 8 wherein the vehicle communication system is further configured to present a modified text message to the user for approval before sending, and replace the text message with the modified text message upon user approval.

13. The system of claim 8 wherein the AI engine is hosted by a third-party provider, an application licensee, or assignee.

14. The system of claim 8 wherein the vehicle communication system is further configured to remove personally identifiable information from text messages before encryption and sending to the AI engine.

15. A method for enhancing text message communication in a vehicle, comprising:

receiving, at a vehicle communication system, user preferences for text message modification;

detecting a trigger event based on the user preferences;

responsive to detecting the trigger event, intercepting a text message;

encrypting the intercepted text message;

sending the encrypted text message to an artificial intelligence (AI) engine for analysis and modification;

receiving the modified encrypted text message from the AI engine;

decrypting the modified encrypted text message; and presenting the decrypted modified text message to a user through a vehicle human-machine interface.

16. The method of claim 15 wherein the trigger event includes one or more of detection of specific vehicle conditions, receipt of a message from a specific contact or category of contacts, detection of specific words or phrases in the text message, detection of emotional content in the text message, time-based triggers, and location-based triggers.

17. The method of claim 15, further comprising delaying notification of an incoming text message based on the user preferences and detected vehicle conditions.

18. The method of claim 15, further comprising applying face blurring to photos in text messages based on the user preferences.

19. The method of claim 15 wherein the AI engine is configured to modify the text message to de-escalate emotional content, increase clarity of communication, remove or modify potentially offensive language, enhance politeness, and increase sophistication of language used.

20. The method of claim 15, further comprising maintaining a secure database of approved contacts and their associated preferences for text message modification, and applying contact-specific modifications to text messages based on the secure database.

* * * * *